US007869968B2

(12) United States Patent
Sakata et al.

(10) Patent No.: US 7,869,968 B2
(45) Date of Patent: Jan. 11, 2011

(54) DIAGNOSIS AND CALIBRATION SYSTEM FOR ICP-MS APPARATUS

(75) Inventors: Kenichi Sakata, Tokyo (JP); Tatsuya Shibukawa, Tokyo (JP)

(73) Assignee: Agilent Technologies, Inc., Santa Clara, CA (US)

( * ) Notice: Subject to any disclaimer, the term of this patent is extended or adjusted under 35 U.S.C. 154(b) by 766 days.

(21) Appl. No.: 11/903,912

(22) Filed: Sep. 25, 2007

(65) Prior Publication Data

US 2008/0099671 A1 May 1, 2008

(30) Foreign Application Priority Data

Oct. 31, 2006 (JP) ............................. 2006-295462

(51) Int. Cl.
*G01D 18/00* (2006.01)

(52) U.S. Cl. ........................... 702/86; 702/85; 702/179; 702/180; 702/181; 702/182; 250/281; 250/282; 250/288; 250/289

(58) Field of Classification Search ................... 702/85, 702/86, 179–182; 250/281, 282, 288, 289
See application file for complete search history.

(56) References Cited

U.S. PATENT DOCUMENTS

| | | | | |
|---|---|---|---|---|
| 5,185,523 A * | 2/1993 | Kitagawa et al. | ............ | 250/281 |
| 5,334,834 A * | 8/1994 | Ito et al. | ..................... | 250/288 |
| 2008/0035844 A1 | 2/2008 | Sakata et al. | | |

FOREIGN PATENT DOCUMENTS

| | | |
|---|---|---|
| DE | 102007032176 A1 | 8/2008 |
| JP | 01-124951 | 5/1989 |
| JP | 11-006788 | 1/1999 |

OTHER PUBLICATIONS

Office Action of Mar. 3, 2010 from German patent application 10 2007 046 367.9-54 (note both the German-language and English-language translations are provided).

* cited by examiner

*Primary Examiner*—Sujoy K Kundu

(57) ABSTRACT

A diagnostic system designed such that an aggregate of parameter combinations is stored, which is an aggregate of combinations of parameters consisting of a first parameter for determining the output of the high-frequency power source, a second parameter for determining the flow rate of the carrier gas in the aerosol, and a third parameter for determining the distance between the plasma torch and the interface, and which forms a specific array such that the measurement points corresponding to the respective combinations are lined up in order along the direction of length of an envelope that forms the end on the high-sensitivity side of a graph drawn as an aggregate of all measurement points on a sensitivity-oxide ion ratio graph, and a diagnostic measurement is performed with a specific diagnostic sample using the parameter value of each combination of the above-mentioned parameter combinations that form the aggregate such that the device properties can be confirmed from the position on the envelope on the sensitivity-oxide ion ratio graph of the actual measurement points corresponding to each combination.

12 Claims, 8 Drawing Sheets

| | RF output (W) | Carrier gas flow rate [ml/min] | Sampling depth (Z)[mm] |
|---|---|---|---|
| 1 | 1450 | 1.10 | 4.5 |
| 2 | 1500 | 1.10 | 4.5 |
| 3 | 1550 | 1.10 | 4.5 |
| 4 | 1600 | 1.10 | 4.5 |
| 5 | 1500 | 1.08 | 4.5 |
| 6 | 1550 | 1.08 | 4.5 |
| 7 | 1600 | 1.08 | 4.5 |
| 8 | 1500 | 1.06 | 4.5 |
| 9 | 1550 | 1.06 | 4.5 |
| 10 | 1600 | 1.06 | 4.5 |
| 11 | 1500 | 1.04 | 4.5 |
| 12 | 1550 | 1.04 | 4.5 |
| 13 | 1600 | 1.04 | 4.5 |
| 14 | 1500 | 1.02 | 4.5 |
| 15 | 1550 | 1.02 | 4.5 |
| 16 | 1600 | 1.02 | 4.5 |
| 17 | 1550 | 1.05 | 6.0 |
| 18 | 1550 | 1.00 | 6.0 |
| 19 | 1550 | 1.10 | 8.0 |
| 20 | 1550 | 1.05 | 8.0 |
| 21 | 1550 | 1.00 | 8.0 |
| 22 | 1550 | 1.05 | 10.0 |
| 23 | 1550 | 1.00 | 10.0 |
| 24 | 1550 | 0.95 | 10.0 |

Rows 1–16: First group (search for point of maximum sensitivity)

Rows 17–24: Second group (measurement of samples having high matrix concentration)

Fig. 7

DIAGNOSIS AND CALIBRATION SYSTEM FOR ICP-MS APPARATUS

This application claims priority from Japanese Patent Application No. JP 2006-295462, filed on 31 Oct. 2006, which is incorporated by reference in its entirety.

BACKGROUND

1. Field of the Disclosure

The present disclosure relates to a diagnostic system and calibration system for analyzer devices, and in particular, to a system for the diagnosis and correction of device properties of an inductively coupled plasma mass spectrometer (ICP-MS).

2. Discussion of the Background Art

The ICP-MS is known as a high-sensitivity analyzer for detecting traces of metal ions. By means of this analyzer, a sample to be measured is introduced inside the plasma and the sample to be measured becomes ions, these ions are extracted, and mass analysis is performed, and the basic structure of this spectrometer comprises a plasma-generating part for generating plasma from a sample such as a liquid, and a mass-analyzing part for extracting ions from the generated plasma and analyzing these ions.

The plasma-generating part, particularly in the case of a liquid sample, comprises a nebulizer for nebulizing a liquid sample using a gas having a specific flow rate; a spray chamber for isolating some of the nebulized liquid drops in the form of an aerosol together with an appropriate gas; and a plasma torch such that plasma is generated from the plasma gas and the aerosol is introduced into this plasma.

In further detail, the aerosol is generated by at least some carrier gas being introduced into the nebulizer together with the liquid sample. When this portion of carrier gas blows the liquid sample, the liquid sample is nebulized. The nebulized liquid drops circulate inside the spray chamber, and only the liquid drops that are relatively small in diameter are transferred toward the plasma torch. These liquid drops of a small diameter, together with the carrier gas for nebulization, form the aerosol and are introduced to the plasma torch. The carrier gas is usually an inert gas, typically argon gas.

The plasma torch comprises an inside pipe into which aerosol containing sample is introduced and one or a plurality of outside pipes disposed such that they surround the inside pipe. Auxiliary gas and plasma gas for generating the plasma can be introduced into the outside pipe. Once the plasma has been generated by the plasma gas through the operation of a work coil, the aerosol containing the sample is introduced and as a result, the metal in the sample is ionized and dispersed in the plasma.

An interface that faces the generated plasma is disposed at the front end of the mass-analyzing part, which is located posterior to the plasma generating part. The interface has a two-step structure of a sampling cone and a skimmer cone, and each of these has an orifice for extracting the ions from the generated plasma. Extractor electrodes for extracting the ions in the form of an ion beam is disposed posterior to the interface. The extracted ion beam is guided to the mass analyzer disposed at the subsequent part and the measurement process of mass analysis is performed. The analysis results can thereby be obtained in the form of a mass spectrum.

The analyzer may have a computer. The computer is used in order to provide control signals such that the flow rate of the gas used is controlled, or to break down the analysis results and perform various other processing tasks. The computer can be used in combination with a user interface comprising an input device and a display device in order to provide the desired effect.

A high-matrix sample is an example of a potential sample to be analyzed by such a device. A "high-matrix sample" is a sample that contains the elements to be measured as well as water-soluble substances, such as metal salts in high concentration samples. Seawater is an example of a high-matrix sample. When a high-matrix sample is analyzed by conventional methods using conventional devices, there are problems in that, as a result of large numbers of ions being guided to the tail of the device, oxides and the like are deposited and pollute the surfaces of the sampling cone, skimmer cone, etc., and the orifices become clogged, making analysis impossible. Consequently, in the case of analysis of such samples, it is necessary to reduce the amount of matrix material entering the mass analysis part via the interface.

A single mass spectrometer capable of high-sensitivity analysis of liquid samples and having a wide range of matrix concentrations would be very effective for practical use. The method whereby a highly concentrated sample that cannot be analyzed directly is diluted to an acceptable extent before aerosol generation is one example. Dilution can be conducted manually or automatically using an autodiluter. For instance, Patent JP Unexamined Patent Publication (Kokai) 11-6788 and JP Unexamined Patent Publication (Kokai) 1-124,951 describe methods for diluting a liquid sample using an autodiluter.

Performing dilution by hand takes time. Diluting many samples is particularly an inconvenience in terms of time, and there is also the chance that there will be errors in dilution. Therefore, there is a need for an automated system for the diluting procedure, as described in Patent References 1 and 2. Nevertheless, there is the chance that the sample will be contaminated by the outside environment or the tools that are used during dilution of the liquid sample.

From this viewpoint, there is a need for novel means for dilution with which it is possible to realize excellent reproducibility and to guarantee a sufficiently wide dilution range by means different from means for diluting a liquid sample in a liquid state. In this case, it is necessary to minimize the operating time by the user. It is particularly necessary to guarantee convenient user operation when there are any parameters that determine the operating status of a device, such as the above-mentioned device. This operating convenience is also effective in preventing errors in measurement data that are generated by misuse of the method.

The applicant previously proposed control means such that the status of the plasma facing the interface changes in JP Application (Tokugan) 2006-219,520 filed prior to the present application as one means for analyzing a sample comprising matrices of various concentrations with good reproducibility using the above-mentioned inductively coupled plasma mass spectrometer. By means of this method, it is possible to reduce the number of ions that pass through the orifice of the interface and analyze with good reproducibility by changing three primary parameters under specific conditions. These three primary parameters are the output of the high-frequency power source, which determines the status of the plasma itself; the flow rate of the carrier gas that transports the liquid drops in the aerosol that is fed to the plasma torch; and the distance between the plasma torch and the interface (sampling depth hereafter). It should be noted with regard to the third parameter that this parameter is more precisely one that indicates the distance between the end of the work coil and the interface. Usually the work coil and plasma torch are anchored at specific positions correlated with one another; therefore, in the Prior Art and Description of the Disclosure, the two versions of the third parameter are regarded as the same, and are described as the distance between the plasma torch and the interface.

By means of this method, when a high-matrix sample is analyzed, the various parameters are set such that the number of ions passing through the interface is minimized and sensitivity is reduced, while when a low-matrix sample is analyzed, the various parameters are set such that the number of ions passing through the interface is increased and sensitivity is increased. It is possible to interchangeably or continuously analyze high-matrix and low-matrix samples by controlling the parameters in this way.

The first problem with this method is that the measurement results tend to fluctuate because, in addition to drift, and similar problems in the three primary parameters, there are many parameters that affect the number of ions that pass through the interface, specifically, that affect the measurement sensitivity, including those that are difficult to control. Specific examples of other parameters are sample liquid transport conditions and the fine-tuned status of the equipment. In essence, there is a problem in that even if analysis is conducted by one device, there is a problem in that measurement sensitivity will change and the measurement data will fluctuate as a result of slight deviations in any of these many parameters.

The second problem with this method is that there are many control parameters, as mentioned above, and there tend to be differences in properties between devices. In essence, even if the device structure is the same, differences in properties are produced with slight deviation between devices in terms of any of the above-mentioned parameters. This is problematic in that, for instance, it complicates the tuning procedure performed by maintenance personnel.

Therefore, the present disclosure provides a diagnosis and calibration system with which it is possible to diagnose the properties attributed to plasma of an inductively coupled plasma mass spectrometer in a short amount of time, and it is possible to automatically change the settings of the device such that they are optimized as necessary with the intention of alleviating the problems associated with the existence of many parameters.

SUMMARY OF THE DISCLOSURE

In order to solve the above-mentioned problems, the present disclosure provides a novel diagnostic system for diagnosing device properties of an inductively coupled plasma mass spectrometer, and a calibration system comprising this diagnostic system. The diagnostic system provided by the present disclosure is a diagnostic system for diagnosing the device properties attributed to the plasma state of an inductively coupled plasma mass spectrometer with which an aerosol comprising carrier gas and liquid drops containing an analysis sample is introduced into a plasma torch disposed near a work coil connected to a high-frequency power source in order to generate plasma, in such a way that it contains ions of the element in the aerosol, toward an interface having an orifice such that part of the components that form the plasma are allowed to pass through the orifice and are introduced into the mass analysis part, characterized in that an aggregate of parameter combinations is stored, which is an aggregate of combinations of parameters consisting of a first parameter for determining the output of the high-frequency power source, a second parameter for determining the flow rate of the carrier gas in the aerosol, and a third parameter for determining the distance between the plasma torch and the interface, and which forms a specific array such that the measurement points corresponding to the respective combinations are lined up in order along the direction of length of an envelope that forms the end on the high-sensitivity side of a graph drawn as an aggregate of all measurement points on a sensitivity-oxide ion ratio graph, and a diagnostic measurement is performed with a specific diagnostic sample using the parameter value of each combination of said parameter combinations that form the aggregate such that device properties can be confirmed from the position on the envelope on the sensitivity-oxide ion ratio graph of the actual measurement points corresponding to each combination.

For instance, the system of the present disclosure can comprise, for diagnosis, means for determining the position on the envelope in a sensitivity-oxide ion ratio graph of measurement points corresponding to each combination based on the coordinates of actual measurement points wherein sensitivity is at a maximum.

Preferably the aggregate of parameter combinations used in measurement comprises a first group of parameter combinations wherein the third parameter is fixed and at least one of the first and second parameters is varied such that the point where sensitivity is at a maximum is determined by diagnostic measurement with a specific diagnostic sample. Moreover, preferably the aggregate of parameter combinations used in measurement comprises a second group of parameter combinations wherein the oxide ion ratio is distributed on the small side, when compared to the first group, on the sensitivity-oxide ion ratio graph, and which is scheduled for use with or without modification by calibration after diagnosis. In this case, depending on the manner in which the parameter combinations are selected, the measurement points corresponding to the parameter combinations that form the first group and the measurement points corresponding to the parameter combinations that form the second group overlap along the envelope on the sensitivity-oxide ion ratio graph.

Moreover, preferably there are means for preadjustment whereby prior to diagnosis, some of the device requirements are adjusted and the sensitivity are optimized before diagnostic. In this case, the means for preadjustment comprises at least one of the following: a torch position adjustment means with which prior to measurement using the aggregate of parameter combinations for diagnosis, sensitivity is measured using parameters set to a specific value and the position of the plasma torch is automatically adjusted in the direction that intersects the axis of the plasma torch such that it becomes the position wherein measurement sensitivity is at a maximum, and an ion lens adjustment means with which prior to measurement using the aggregate of parameter combinations for diagnosis, sensitivity is measured using parameters set to a specific value and the conditions of the ion lens located posterior to the interface inside the mass analysis part are adjusted to conditions where the measurement sensitivity is at a maximum within a specific condition range.

Preferably a shared software module for reading the parameters used in measurement is used for both preadjustment and diagnostic measurement. The software module may have a scanning module for measuring with scanning an entire specific range of each of the selected parameters and a jump module for measuring for a specific parameter group of part of the specific range in accordance with the selected parameter or purpose of use.

The present disclosure further provides a calibration system comprising the above-mentioned diagnostic system. The first calibration system comprises calibration means for preselecting a measurement point corresponding to a specific combination from among the aggregate of parameter combinations as the estimated maximum sensitivity point where sensitivity is estimated to be at a maximum and, when the estimated maximum sensitivity point differs from the actual measurement point where sensitivity is at a maximum as discovered from the diagnostic results, correcting each parameter value of at least some of the parameter combinations contained in the aggregate of parameter combinations by a specific rule such that maximum sensitivity can be produced at the points corresponding to the estimated maximum sensitivity points during actual measurement. In this case, the parameter changed by calibration can be the second parameter.

The second calibration system comprises calibration means wherein, when the ratio of sensitivity at an actual measurement point where sensitivity is at a maximum based on diagnostic results and sensitivity at a predetermined reference measurement point corresponding to one combination of the aggregate of parameter combinations is outside a specific ratio, each parameter of at least some of the parameter combinations contained in the aggregate of parameters combinations is corrected by a specific rule. In this case, the parameter changed by calibration can be the second or third parameter.

By means of the diagnosis and calibration system of the present disclosure, an on-site user of the above-mentioned ICP-MS can confirm whether or not the standard properties of a device are stable, and reproducibility can be improved when samples of various matrix concentrations are actually measured. Moreover, the diagnosis and calibration system of the present disclosure can also be used when the user is performing maintenance operations, and the operator can easily confirm the properties of the device in a short amount of time.

BRIEF DESCRIPTION OF THE DRAWINGS

FIG. 7 is a drawing showing the data structure for the diagnostic measurement contained in the module used in the operation of the present disclosure.

DETAILED DESCRIPTION OF THE PREFERRED EMBODIMENT

The diagnosis and calibration system for an ICP-MS that is a preferred embodiment of the present disclosure will now be described while referring to the attached drawings. First, the general structure of the ICP-MS will be shown and the diagnosis and calibration system will then be described. It should be noted that the term "dilution" used in the description of the mode of operation of the present disclosure that follows includes all means with which it is possible to reduce the amount of sample ions that pass through the interface part, and in places other than the description of prior art, it also refers to so-called "dry" dilution by which a liquid is not used.

Figure 1:
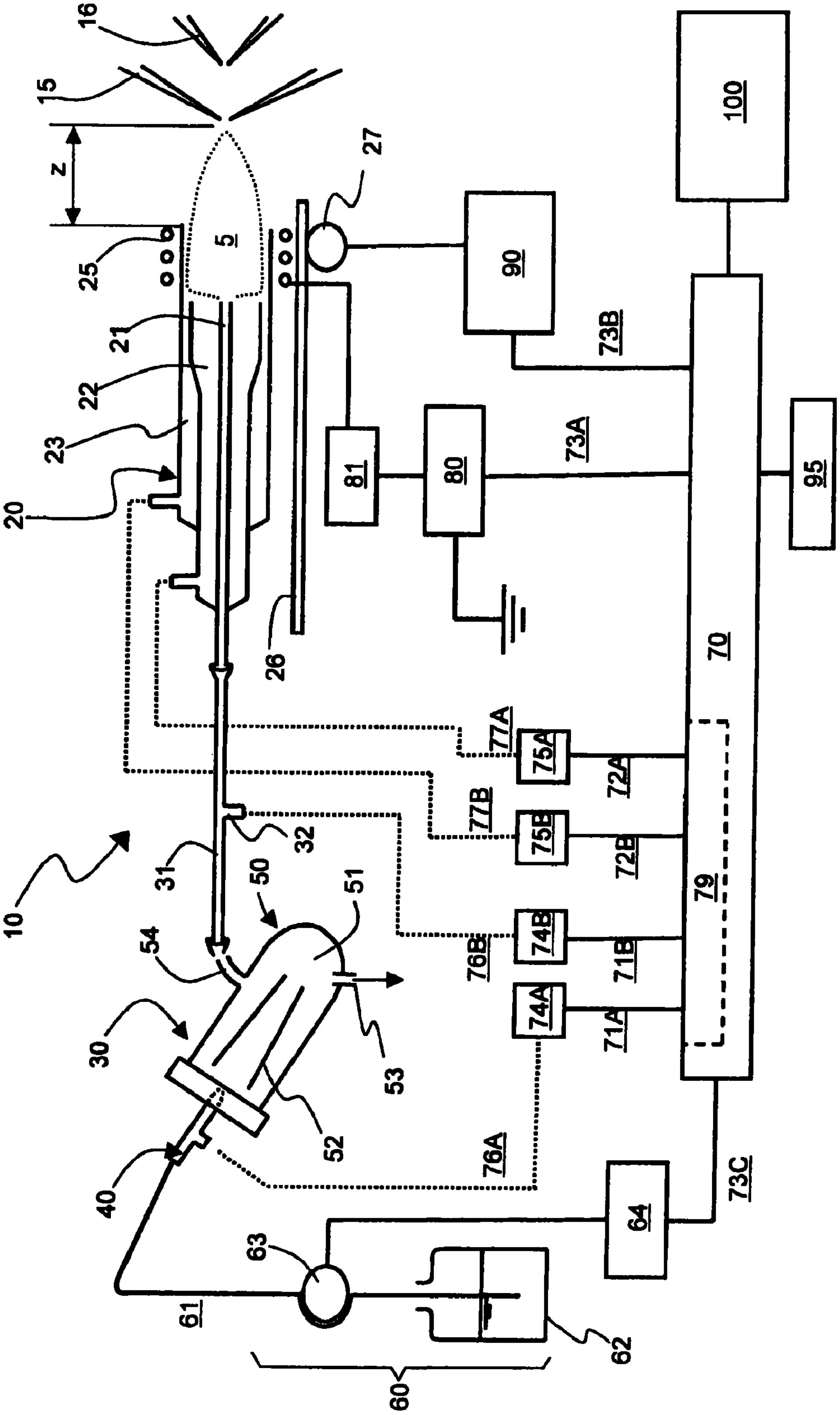
FIG. 1 is a drawing showing primarily the plasma generating part of the main section of the ICP-MS used by the present disclosure.

FIG. 1 shows primarily the plasma-generating part of the main section of the ICP-MS of the present disclosure. This type of ICP-MS comprises a mass spectrometer part at the back of the plasma generating part. FIG. 1 shows only a sampling cone 15 and a skimmer cone 16, which are at the front of the mass-analyzing part and form the interface part that acts to extract the ion beam. Although not illustrated, the ion beam that is guided toward the back of skimmer cone 16 is guided to the mass spectrometer that is positioned farther back. The ion beam is thereby separated based on their mass-charge ratio, and the elements are identified.

The primary structural elements of a plasma-generating part 10 are an aerosol-generating means 30 and a plasma torch 20. Aerosol-generating means 30 comprise a nebulizer 40 for nebulizing a liquid sample and a spray chamber 50 for circulating the nebulized liquid sample and isolating only the liquid drops that are relatively small in diameter.

A liquid sample 61 and a gas 76A for generating aerosol are supplied to nebulizer 40. Liquid sample 61 can be nebulized by blowing gas 76A at a specific flow rate onto liquid sample 61 that is introduced. An inert gas, typically argon gas, is used to generate the aerosol. Control of the amount of gas supplied is discussed later.

Liquid sample 61 is introduced by liquid sample feed means 60. Liquid sample feed means 60 comprises a vessel 62 in which liquid sample is stored and a peristaltic pump 63 disposed at a position along the piping. Peristaltic pump 63 is controlled by a control part 64. In essence, control part 64 controls peristaltic pump 63 such that the pump feeds the necessary amount of liquid sample 61 from vessel 62 to nebulizer 40.

Spray chamber 50 houses a chamber 51 through which the nebulized liquid drops are capable of circulating. A cylindrical wall 52 is formed inside chamber 51 such that gas flows in opposite directions inside and outside the chamber. The nebulized liquid drops are transported by the gas flows. However, the liquid drops that are relatively large in diameter adhere to the innner wall surface of chamber 51 and are discharged through a drain 53. The liquid drops of relatively small diameter are on the other hand discharged as aerosol through a connecting opening 54 in the direction of a connecting pipe 31.

Aerosol is supplied through connecting pipe 31 to plasma torch 20. It should be noted that an inlet 32 for additional diluting gas 76B that is added for dilution is disposed in the middle of connecting pipe 31. The effect of additional diluting gas 76B is discussed later.

Plasma torch 20 comprises first and second outside pipes 22 and 23 on the outside of an inside pipe into which aerosol is introduced. An auxiliary gas (or middle gas) 77A is introduced into first outside pipe 22, and a plasma gas 77B is introduced into outermost second outside pipe 23. A work coil 25 connected to a high-frequency power source (RF power source) 80 via a matching box 81 is disposed at the tip of plasma torch 20.

Work coil 25 provides plasma torch 20 with the energy for generating a plasma 5. It is possible to bring plasma 5 to an ignited state by turning on high-frequency power source 80 after auxiliary gas 77A and plasma gas 77B have been supplied to plasma torch 20. Then, in order to analyze the sample, the aerosol containing the liquid drops of liquid sample is introduced from inside pipe 21. As a result, the elements present in the liquid drops of the aerosol are ionized in plasma 5.

It is possible to increase or decrease the number of ions that pass through interface 15 and 16 by changing the output of high-frequency power source 80. It is possible to reduce the number of ions that pass through interface 15 and 16 by raising the output of high-frequency power source 80 under the specific conditions described later in relation to the oxide ion-ratio graph.

By means of the present embodiment, plasma torch 20 is anchored on a table 26, which can be moved by a drive mechanism 27, such as a motor. As a result, plasma torch 20 can be moved along the direction of introducing aerosol. This adjusts the distance Z between plasma torch 20 and interface 15 and 16 (sampling depth). An X-Y stage is typically used as table 26. Drive mechanism 27 is controlled by a control part 90. FIG. 1 shows only plasma torch 20 anchored to table 26, but it is possible to anchor to the table, in addition to plasma torch 20, the other parts of the system that include spray chamber 50 and nebulizer 40, such that these parts can be moved by drive mechanism 27 too. Moreover, it is also possible to anchor the structure to the torch side and change the position of the interface in order to change the value of Z.

In general, the number of ions that pass through interface 15 and 16 shows a tendency toward increasing as the distance Z becomes shorter, and the number of ions that pass through shows a tendency toward decreasing as distance Z becomes longer. Consequently, it is possible to adjust the number of ions that pass through interface 15 and 16 by the adjusting distance Z between plasma torch 20 and the interface.

One characterizing feature of this apparatus is that it is possible to easily and with good reproducibility dilute the liquid sample, such as a high-matrix sample, by appropriately controlling both the carrier gas that forms the aerosol and the plasma comprising the metal ions contained in the aerosol. In essence, by means of the control system of the present apparatus, a time-consuming diluting process using a liquid is unnecessary and the procedure that must be conducted by a user is very simple. The effect of the control system will now be described.

The ICP-MS of the present embodiment comprises a control device 70, a memory 95 connected to the control device, and a user interface 100. These can be a single computer. Control device 70 is designed such that control signals 73A, 73B, and 73C are respectively sent to high-frequency source 80, to control part 90 for controlling drive mechanism 27, and to control part 64 for controlling peristaltic pump 63 for feeding liquid sample 61. Furthermore, control device 70 also comprises a gas control part 79 for controlling gas.

Gas control part 79 can send control signals 71A, 71B, 72A and 72B to gas flow rate control devices 74A, 74B, 75A, and 75B. Control signals 71A and 71B determine the amount of aerosol-generating gas 76A and additional diluting gas 76B to be fed to the respective gas flow rate control devices 74A and 74B, and control signals 72A and 72B determine the amount of auxiliary gas 77A and plasma gas 77B to be fed to gas flow rate control devices 75A and 75B.

Control device 70 can comprise one or multiple ICs. Moreover, control device 70 can be designed as a computer having a display that is obtained by combination, as one unit with or separate from, user interface 100. Memory 95 can be designed as a memory that can be written over. Memory 95 is connected to the control device in FIG. 1, but it can also be designed such that it is connected with user interface 100.

Controlling by Gas control part 79 can give dilution performed in an aerosol state. As shown in the drawing, it is possible to add additional diluting gas 76B to the aerosol transferred from spray chamber 50 and reduce the ratio of liquid drops of liquid sample to the total amount of carrier gas. When dilution in the aerosol step is not necessary, such as in the case of analysis of a low-matrix sample, only aerosol-generating gas 76A serves as the carrier gas for the aerosol. On the other hand, in the case of analysis of a high-matrix sample, it is possible to dilute the aerosol by adding additional diluting gas 76B. In the latter case, both aerosol-generating gas and additional diluting gas serve as the carrier gas.

In essence, by means of the present embodiment, the ratio of liquid drops contained in the aerosol that reaches plasma torch 20 and the flow rate of the carrier gas can be determined comprehensively but on a one-to-one basis by controlling the amount of liquid sample 61 to be fed via control signals 73C and by controlling the flow rate of aerosol-generating gas 76A and additional diluting gas 76B via control signals 71A and 71B.

Therefore, it is possible to record the relationship between the liquid drop content ratio in the aerosol and the flow rate of aerosol-generating gas 76A and/or the amount of liquid sample fed and to numerically convert the degree to which the aerosol is diluted by adding the flow rate of the diluting additional gas 76B to the flow rate of the carrier gas. This numerical conversion is an effective means for guaranteeing good reproducibility of dilution.

Performing controllable dilution after aerosol generation is also effective in terms of controlling plasma 5, which is discussed below. In case of no means for supplying additional diluting gas 76B, when the liquid drop content ratio is changed by reducing the amount of aerosol-generating gas fed during aerosol generation, so as to dilute the sample, the total flow as carrier gas is also reduced. As a result, the extent to which plasma 5 generated by plasma torch 20 is cooled by the carrier gas of the aerosol is reduced. In this case, it eventually becomes very difficult to control with good precision the number of ions that pass through interface 15 and 16.

Even if the amount of aerosol-generating gas supplied is reduced, the device of the present embodiment is capable of preventing changes in the total flow rate of carrier gas resulting from the addition of the optimum amount of additional diluting gas. Therefore, it is possible to feed to plasma torch 20 an aerosol that is different only in terms of the liquid drop content without changing the flow rate of carrier gas in the aerosol and thereby guarantee sufficient reproducibility of the analysis results.

The fundamental data for controlling each gas by gas control part 79 can be directly input using user interface 100, or it can be pre-stored in memory 95. Although not illustrated, user interface 100 can comprise an input device and a display for displaying input and control status, and similar features.

Figure 2:
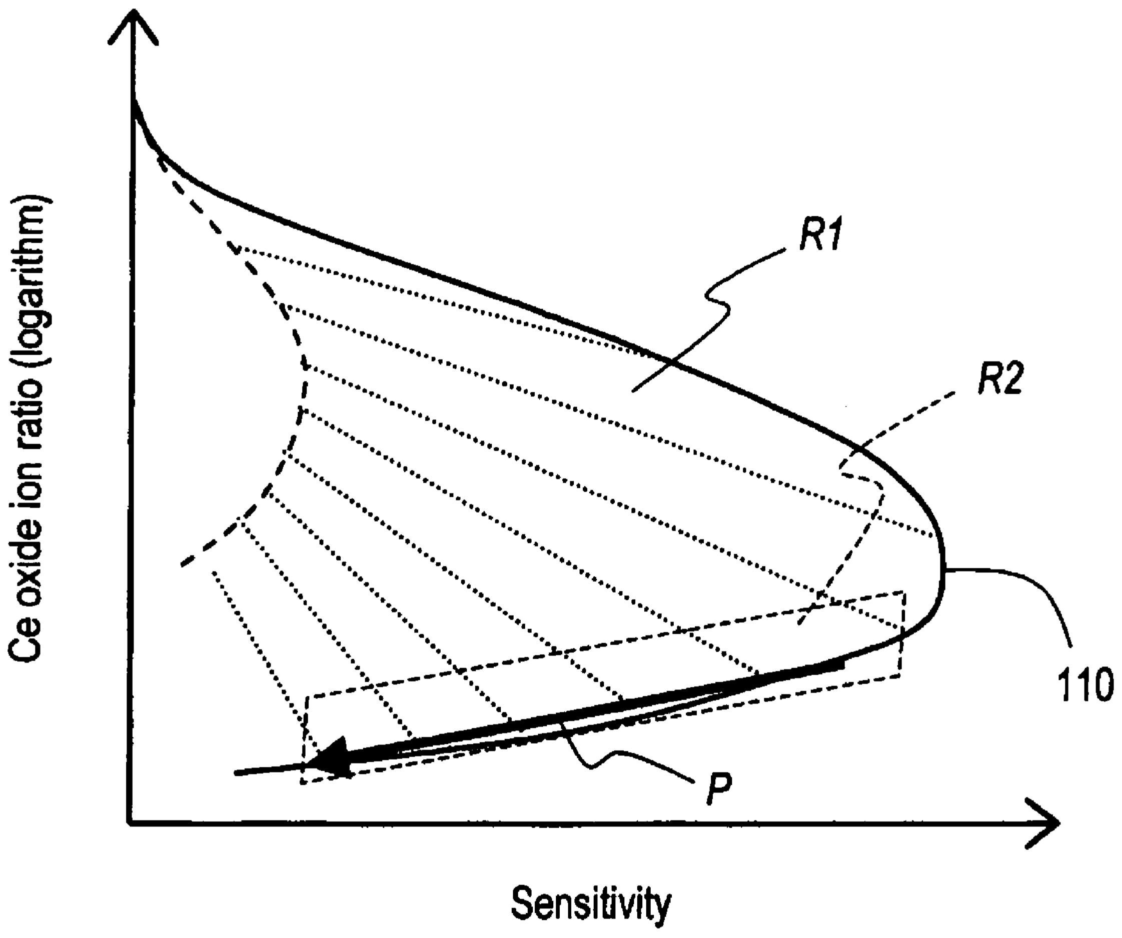
FIG. 2 is a drawing showing a graph of the so-called sensitivity-oxide ion ratio that is referred to in order to determine the control factors in the present disclosure.

FIG. 2 is a graph showing the so-called sensitivity-oxide ion ratio property that is referred to in order to determine the control factors of the device of the present embodiment. This graph of the sensitivity-oxide ion ratio shows the detection sensitivity for a specific ion on the x axis, and the oxide ion ratio of the ion in question on the y axis represented as a logarithm. The region enclosed by curved lines in the figure shows the distribution of measurement points when the above-mentioned factors, in essence, the carrier gas flow rate, the high-frequency power source output, and the distance Z between the plasma torch and interface, are changed as variable parameters. By means of the present embodiment, Ce (cerium) is used as the specific ion, but it is also possible to use Ba (barium) or La (lanthanum). Moreover, the indicator is not limited to the oxide ion ratio and can be a ratio of sensitivity for ions and another compound that is an indicator of a physical phenomenon as represented by the present disclosure.

By means of the device of the present embodiment, control is possible by being able to constantly regulate the control parameters. This ability to regulate is derived from the sensitivity-oxide ion ratio. As illustrated, the measurement points are distributed within region R1 sandwiched between two curved lines. By means of the device of the present embodiment, each of the above-mentioned parameters is set such that they become points along arrow P when positioned at the bottom of an outside envelope 110. In other words, all of the factors controlled by the control device are set such that, on the sensitivity-oxide ion ratio graph showing the relationship between sensitivity for a specific metal ion and oxide ions of the metal ion, they conform to conditions that are along the envelope wherein the log of the oxide ion ratio is virtually proportional relative to sensitivity when the oxide ion ratio is at virtually the minimum for each sensitivity.

In essence, by means of the apparatus of the present embodiment, it is possible to change only the amount of liquid drops without changing the total flow rate of carrier gas in the aerosol that will be supplied, and it is possible to change only the carrier gas flow rate without changing the amount of liquid drops supplied per unit of time. In the latter case, the plasma state, such as the plasma temperature, changes in accordance with the flow rate of the carrier gas.

Nevertheless, when the plasma temperature is particularly low, the matrix element bonds with other elements so that it is not in the state of single element ions and interference is produced that becomes an impediment to the analysis of the element to be measured. This state is undesirable when intentionally produced, particularly when the object is the analysis of a specific element. Therefore, whether the total flow rate of carrier gas is low or high, by means of the device of the present embodiment, the above-mentioned parameters are set such that temperature of the plasma (particularly the gas temperature) does not fall. For example, in the case of the present embodiment it is possible to determine a point corresponding to a combination of control parameters as a point on the inside of region R2, which is demarcated by a specific oxide ion ratio and sensitivity, as shown by the parallelogram in the graph in FIG. 2. The region can be determined by a variety of methods, such as satisfying a specific numerical relationship, or by setting a specific numerical range.

By using this parameter setting method, it is possible to maintain a relatively high gas temperature during analysis, and to prevent negative effects on analysis precision as a result of the element to be measured forming other compounds, whether the flow rate of the carrier gas is relatively low, or vice-versa, the flow rate of carrier gas has been increased for dilution, as will be discussed below.

As previously mentioned, when the variable parameters are determined by direct input by a user, it is possible to reject the use of the input value if the input value is outside a specific range (for instance, outside region R2 in FIG. 2). In essence, for instance, if user interface 100 determines that an input parameter is inappropriate after parameters have been input in succession, it is possible to reject the parameter, or another possible example is the use of an alarm once all of the parameters have been input. On the other hand, when the device of the present embodiment is designed such that each variable parameter is pre-stored in memory 95, it is possible to select a group of stored parameters that satisfies the above-mentioned conditions.

As previously described, by means of the ICP-MS, it is difficult to realize reproducibility when the number of ions in a sample that passes through the interface changes with the plasma state relative to the interface because of the many parameters that determine such conditions. In essence, the state of the plasma changes with even just a slight shift in certain types of parameters, and in such cases, there is a problem with the credibility of the measurement results. Moreover, if at least the fundamental parameters are adjusted when measuring samples of a high matrix concentration, it will be possible to determine with good precision the extent of dilution. Therefore, by means of the apparatus of the present embodiment, it is possible to diagnose device properties as necessary and calibrate the parameters that operate the device such that a state near the estimated plasma state can be provided with good reproducibility during measurement.

Figure 3:
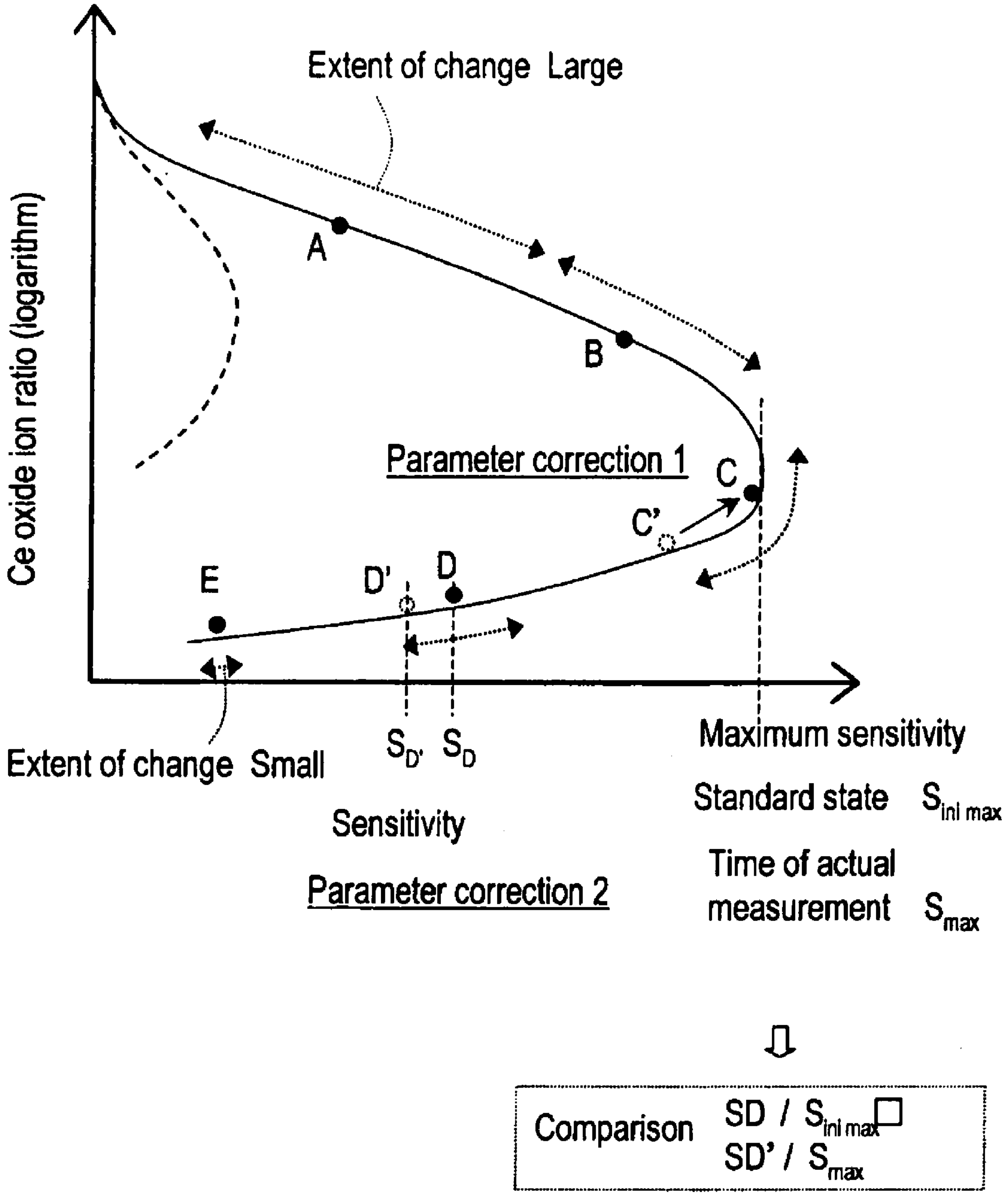
FIG. 3 is a drawing showing a graph of the same sensitivity-oxide ion ratio as in FIG. 2, and is a drawing for describing the theory behind the diagnostic method of the present disclosure.

FIG. 3 is a drawing showing a graph of the sensitivity-oxide ion ratio as in FIG. 2, and is used for describing the theory behind the diagnostic means of the present disclosure. The theory of diagnosis and correction of the present disclosure will be described while referring to FIG. 3.

By means of the device of the present embodiment, the criterion for evaluating the properties relating to plasma of this device is the position of the points along the envelope that forms the end of the high-sensitivity side in the drawing of all measurement points on the graph of the sensitivity-oxide ion ratio. Five measurement points A, B, C, D, and E are represented as an example in FIG. 3. The inventors of the present disclosure experimentally confirmed that when the plasma settings (plasma conditions that determine temperature and the number of ions that pass through the interface in the present application; also referred to hereafter as simply plasma conditions) are changed, or when they change over time, these points move along the lengthwise direction of this envelope. The movement of each point is estimated to correspond to the relationship with the plasma temperature, which is a combination of the plasma electron temperature and gas temperature. In essence, the one-dimensional direction along the envelope forms the relationship of monotonic increase with respect to the plasma temperature of the system. In the figure, the plasma temperature on the A side is relatively low and the plasma temperature on the E side is relatively high.

The arrows facing in both directions in the figure show the direction of movement of the measurement points, but do not limit the range of movement. For instance, as long as there is a large change in the plasma conditions, measurement point A can move up to near the position represented as point C. However, the length of the arrow represents the extent of movement. In essence, the position of measurement point A changes considerably in response to a change in the plasma conditions. On the other hand, measurement point E is not sensitive to changes in plasma conditions, and the amount by which that point moves is small.

Based on the above-mentioned, it is clear that the properties of this device attributed to plasma conditions can be evaluated based on the position of each measurement point on the sensitivity-oxide ion ratio graph. FIG. 3 shows only five points, but in actual diagnosis, the shape of the envelope can be distinguished by using more measurement points. Although the number of measurement points can be increased to the point that a curve is drawn by interpolation between points, it takes more time than necessary for diagnostic measurement when there are many measurement points, which is undesirable. For practical purposes, it is preferred that the number of points be such that diagnostic measurement can be completed within approximately 5 minutes.

By means of the device of the present embodiment, diagnosis is performed after finding the point where measurement sensitivity is at a maximum and finding the shape of the envelope using that point as the criterion in order to easily and precisely perform diagnostic evaluation. Using the point of maximum sensitivity as the criterion makes possible an evaluation by numerical values based on these coordinates, and is related to more precise diagnostic evaluation. It should be noted that in FIG. 3, measurement point C is shown as the point of maximum sensitivity.

Figure 4:
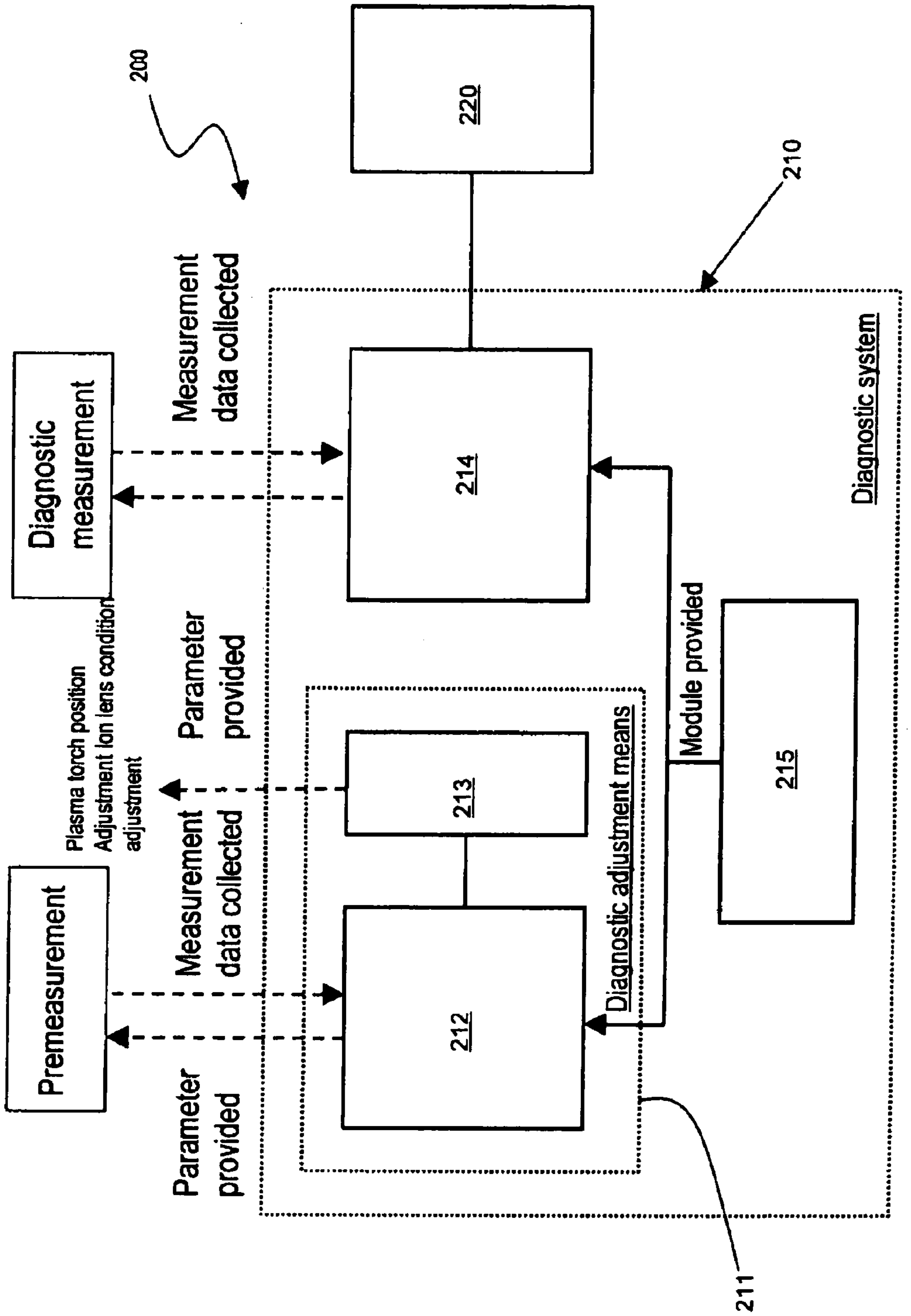
FIG. 4 is a drawing showing the structure of the software that is a part of the diagnostic system of the present disclosure.
Figure 5:
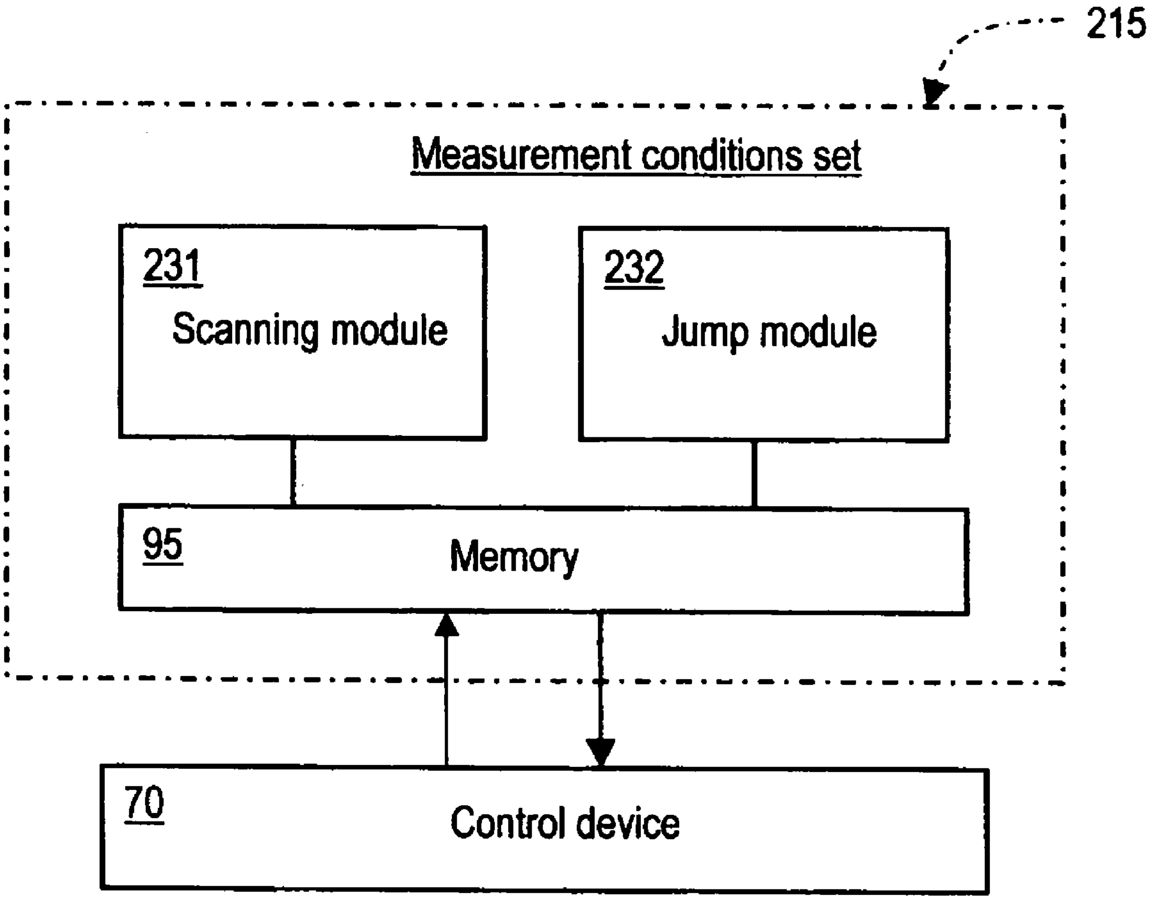
FIG. 5 is a drawing describing the details of the module-providing means that is a part of the software shown in FIG. 4.
Figure 6:
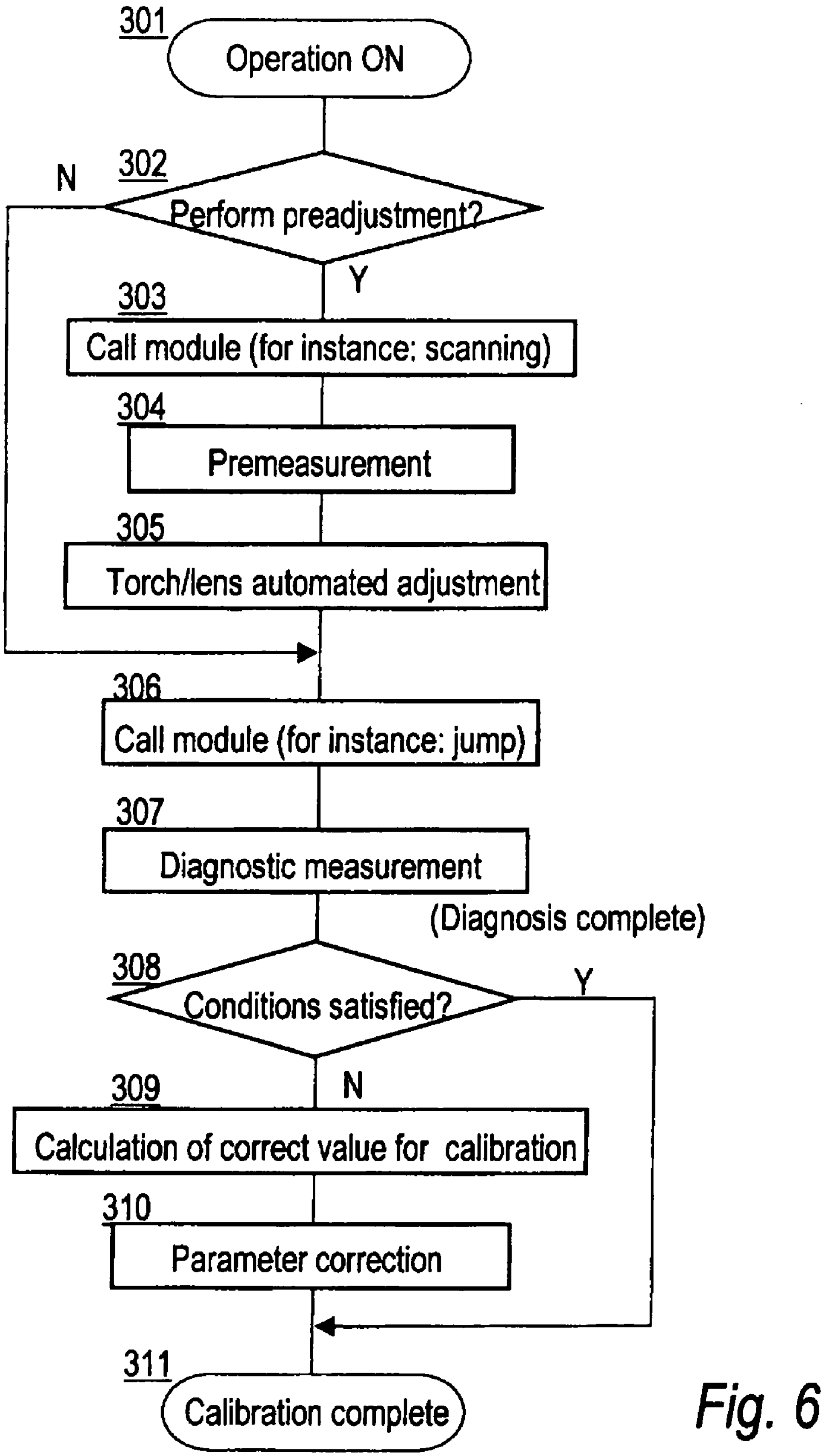
FIG. 6 is a flow chart representing the mode of operation of the calibration system of the present embodiment.
Figure 8:
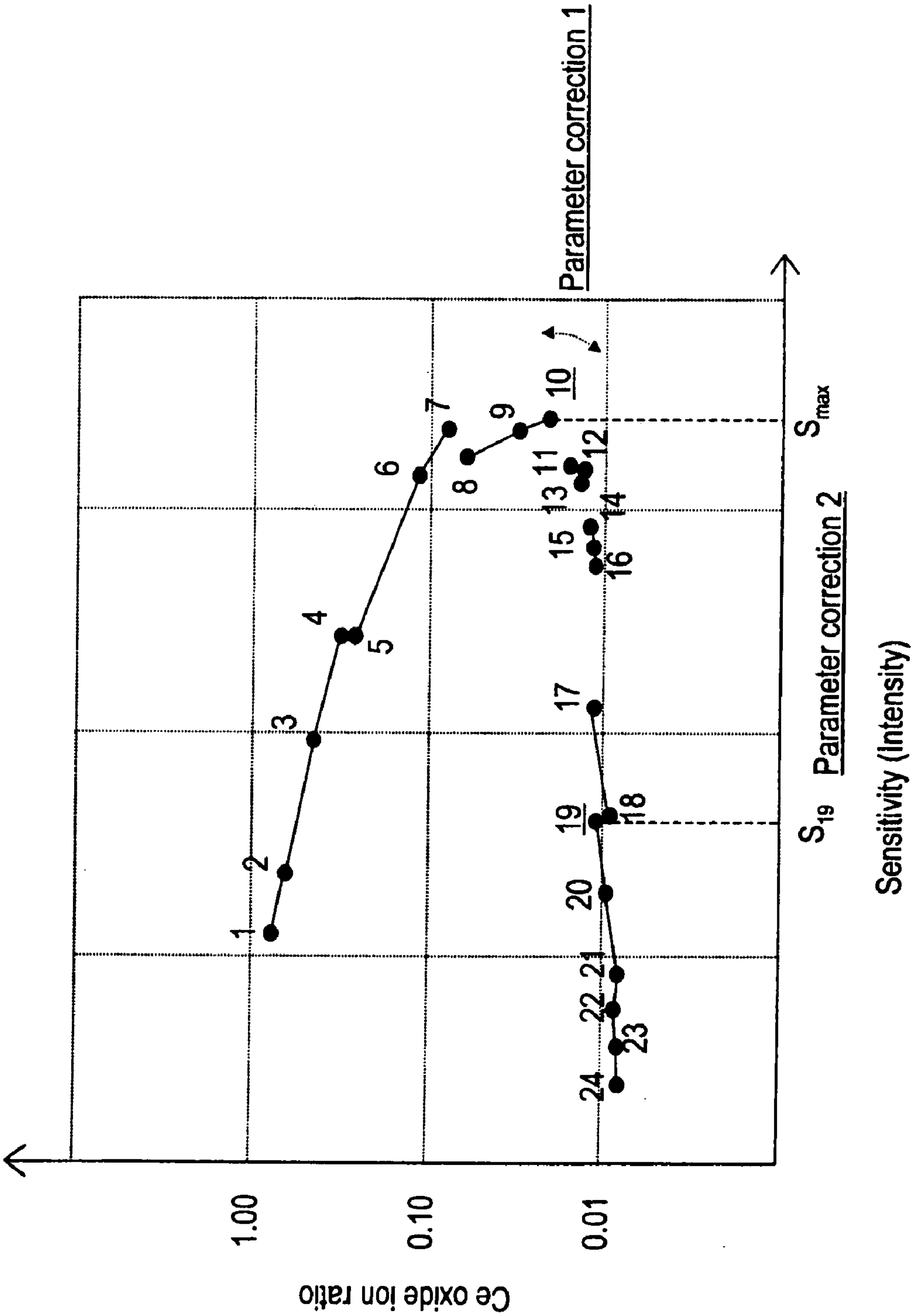
FIG. 8 is a drawing showing a graph of the sensitivity-oxide ion ratio for the measurement results based on the above-mentioned data structure.

FIG. 4 is a drawing showing the structure of the software that forms a part of the diagnostic system of the present disclosure. FIG. 5 is a drawing describing the details of the module means that is part of the software shown in FIG. 4. FIG. 6 is a flow chart that represents the effect of the calibration system of the present embodiment. FIG. 7 is a table showing the data structure for diagnostic measurement contained in the module used in the operation of the present disclosure, and FIG. 8 is a graph showing the sensitivity-oxide ion ratio as the measurement result based on this data structure.

The diagnosis and calibration system of the present disclosure will be described using FIGS. 4 through 8. The mode of operation of the present disclosure will be described in order, and the software structure will be described as needed, based on the flow chart in FIG. 6. The mode of operation of the entire calibration system is shown in FIG. 6, but a diagnostic system that does not have a final mode for adjustment or correction of parameters also falls within the embodiments of the present disclosure.

Automated operation of the system is started (step 301) when the calibration system is turned on. In anticipation of ease of operation by an on-site user, the system of the present embodiment is a system whereby operation is automated until calibration is completed. Although not illustrated, in the case of maintenance operations, etc., it is also possible to set the mode such that the procedure is temporarily stopped after a specific step.

A system that has been turned on can first perform a preadjustment (step 302). Preadjustment is the mode of operation whereby before diagnostic measurement, the position in the direction that intersects the axis of the plasma torch is optimized and aligned with the axis, and the voltage condition of the ion lens is optimized for diagnostic measurement. When necessary, it is possible to use only one of these two modes. If the position of the plasma torch or the voltage condition of the ion lens is not optimized, there is a possibility that the above-mentioned shape of the sensitivity-oxide ion envelope will be inappropriate and diagnosis will not be performed appropriately. Therefore, usually preadjustment should be performed every time diagnostic measurement is performed. However, when it can be guaranteed that the settings have been completed and it is necessary to curtail sample measurement time, this preadjustment can be omitted. It should be noted that although the only preadjustment in the present embodiment is the alignment of the plasma torch and the adjustment of the ion lens voltage condition, depending on the device, other parameters can also be adjusted.

When the preadjustment operation is started, the first module that is read out is the module containing the parameters as measurement conditions. The structure of the software of the system of the present embodiment will be described in relation to reading the module.

As previously described, the software structure of the system of the present embodiment is shown in FIG. 4. When the above-mentioned system for diagnosis and calibration is provided by joint operation of software means contained in control device 70 and memory 95, and the like, and other hardware means, only the structure of these software means are shown in FIG. 4. Reference 200 in FIG. 4 is a calibration means. Calibration means 200 comprises a diagnostic means 210 and a parameter correction means 220. Diagnosis means 210 further comprises a preadjustment means 211, a diagnostic measurement means 214, and a module-providing means 215, and preadjustment means 211 comprises a premeasurement means 212 and an adjustment command means 213.

Of these, preadjustment means 211 and module-providing means 215 are used for the above-mentioned preadjustment. It should be noted that one characterizing point is that module-providing means 215 works not only in cooperation with premeasurement means 212, but also with diagnostic measurement means 214.

The details of module-providing means 215 are shown in FIG. 5. Module-providing means 215 uses two modules. One is a scanning module 231, and the other is a jump module 232. Scanning module 231 fixes some of a plurality of parameters, and measures N dimensions within the entire range of the remaining necessary parameters. Jump module 232, on the other hand, measures only a specific parameter group of specific parameters as deemed appropriate for those parameters. The settings for each parameter corresponding to scanning module 231 and jump module 232 are pre-stored in memory 95. Scanning module 231 and jump module 232 corresponding to the parameter type are read by control device 70 in accordance with the necessary operation.

In order to describe the operation of the above-mentioned modules with a simple example, there will be three parameters, and the orthogonal coordinates of these three parameters will be set. When scanning module 231 is used, measurement is performed for all continuous or discrete points within the parameter range that corresponds to the entire volume as represented by a cuboid or regular hexahedron, while when a jump module is used, measurements are performed at sporadic measurement points as they relate to the parameters in question that have been selected in accordance with the parameters.

Scanning module 231 and the jump module can be used not only in diagnostic systems relating to plasma conditions as described in the present embodiment, but also for diagnosis and calibration relating to various parameters. For instance, it is possible to call these modules from outside the diagnostic system and use them for a variety of parameters not shown in the present embodiment when performing the diagnosis needed for operations such as maintenance.

Usually scanning module 231 is called for premeasurement. The parameters that are the subject of premeasurement are the coordinates in two dimensions within the plane intersecting the axis of the plasma torch and the one-dimensional or two-dimensional voltage range applied to the ion lens. The three primary parameters for setting plasma conditions, in essence, the first parameter for determining the output of the high-frequency power source, the second parameter for determining the flow rate of carrier gas in the aerosol, and the third parameter for determining the distance between the plasma torch and the interface, are fixed at a predetermined specific value during premeasurement.

Premeasurement means 212 gives the device parameters relating to a specific range of coordinates for two dimensions within the plane that intersects the axis of the plasma torch and the voltage range applied to the ion lens based on the scanning module that has been called in step 303, performs multidimensional premeasurement, and collects measurement data (step 304). It should be noted that a standard sample is used for premeasurement and the diagnostic measurement described later. For instance, this sample can be a Ce solution sample having a specific concentration (for instance, a concentration of 10 ppb or 1 ppb).

The parameter value wherein sensitivity is at a maximum under these conditions is selected as the optimum value from the results of premeasurement (step 304). Adjustment command means 213 shown in FIG. 4 provide the necessary command to means for changing the plasma torch position, or a voltage setting device for the ion lens electrode based on the selected value and adjusts the plasma torch and ion lens (step 305).

Once preadjustment has been completed, preparation for diagnostic measurement is started. As in the case of premeasurement, the first step is to call the module (step 306). In the case of diagnostic measurement, it is necessary to be able to estimate to a certain extent the behavior associated with each parameter without complicating measurement and to curtail measurement time. Therefore, jump module 232 is usually called. The parameters that are the subject of measurement in this case are the above-mentioned three primary parameters, in essence, the first through third parameters.

Diagnostic measurement means 214 give the device parameter values based on jump module 232 relating to the three primary parameters that have been called, performs diagnostic measurement, and collects the measurement data (step 307). FIG. 7 shows an example of a list of parameters selected by jump module 232, and FIG. 8 shows the measurement results thereof.

As shown in FIG. 7, the first and second groups of aggregates of parameter combinations are the aggregates of parameter combinations associated with selection of the jump module relating to the three primary parameters that is used in diagnosis in the present embodiment. A characterizing feature is that in the first group, sampling depth, in essence, the distance between the plasma torch and the ion lens, is held constant as a relatively small, or the smallest, value, and in the second group, the output of the high-frequency power source (RF output) is held constant.

This is because, in contrast to the fact that the parameter combinations of the first group are used for the purpose of searching for measurement points where sensitivity is at a maximum during diagnostic measurement, the parameter combinations of the second group are used for measurement of samples having a high matrix concentration after diagnostic measurement. It should be emphasized that when compared to the first group of parameter combinations with which maximum sensitivity can be obtained, the second group of parameter combinations is determined based on relatively stable, robust conditions that correspond to measurement points wherein the oxide ion ratio of the sensitivity-oxide ion ratio is on the small side. Such robust conditions can be realized by, for instance, adjustment such that the sampling depth is set somewhat greater, but in this case, the point corresponding to the respective combination of each parameter would move slightly toward the inside of the envelope.

It should be noted that although the first and second groups are not differentiated during measurement, as previously described, only the second group is actually scheduled to be used for the measurement of samples having a high matrix concentration, and the two groups therefore are handled separately from one another during diagnostic evaluation and correction processing.

The combinations of parameters forming the first and second groups are, as a result of measurement under the standard state prior to shipping, the envelope in the chart formed by all measurement values on the graph of the sensitivity-oxide ion ratio, and are pre-used as parameters corresponding to measurement points at positions along the envelope that forms the end of the side where sensitivity is high. The number of parameter combinations can be assigned in order from the side where the above-mentioned plasma temperature is estimated to be low. By means of the example in FIG. 7, sampling depth and RF output are set at constant values for all of the first and second groups, but it is not essential that all of the values be constant, and it is possible for a small portion of the first or second group to have constant parameter values.

According to the measurement results shown in FIG. 8, the measurement point corresponding to "10" in the table in FIG. 7 is the point where measurement sensitivity is at a maximum. Property quality is evaluated based on this result (step 308). The property of the device as it relates to plasma conditions can be evaluated as good when the requisites of (1) the point of maximum sensitivity should be measurement point "10," (2) the ratio of sensitivity of a specific measurement point versus maximum sensitivity is within a specific range, and (3) this sensitivity is within a constant allowable range, etc. are satisfied as diagnostic criteria in accordance with the method of correction from the standard state prior to shipping that is described below. On the other hand, if these conditions are not satisfied, the properties of the device can be evaluated as "poor." The graph in FIG. 8 can be displayed in the appropriate format on user interface 100.

When the user uses this system as a diagnostic system, the entire mode of operation is completed at step 307. If necessary, the mode of operation as a calibration system can be performed in continuation thereafter. When the diagnostic evaluation is "good", the operation is completed without correcting parameters (step 311). When the evaluation is "poor," the necessary parameter correction is performed.

Parameter correction for calibration is performed by operating parameter correction means 220. Parameter correction means 220 calculates the amount of parameter correction for calibration (step 309), and corrects parameters based on the calculated amount of correction (step 310). By means of the present embodiment, the following two types of methods are used as methods for correcting parameters. It is possible to use either of the methods, or a combination correction can be performed.

The first method is the method whereby it is determined that under normal conditions, the point of maximum sensitivity is a specific point, and the amount of parameter correction is calculated from the magnitude of the difference between the specific point and the corresponding actual measurement point. When explained using FIG. 3, if the measurement point of maximum sensitivity under standard conditions is measurement point C, when diagnostic measurement is performed under the parameter conditions for measurement point C and the corresponding measurement point is measurement point C' which does not provide maximum sensitivity, the amount of correction is found from the magnitude of the difference in these measurement points in the coordinates (step 309). In essence, measurement point C' is the point where sensitivity is originally at a maximum; therefore, correction is performed by changing at least one of the primary parameters taking into consideration the current state of the device such that this measurement point becomes the point of maximum sensitivity. It should be noted that it is preferred that the parameter to be corrected is the second parameter, that is, the carrier gas flow rate. This is because when searching for the point of maximum sensitivity, the operating range can be broader than the other parameters and it is easier to adjust within a narrower range.

The second method is the method whereby the ratio of the sensitivity at a specific measurement point to the maximum sensitivity under standard conditions is determined, the ratio of the sensitivity at the actual measurement point corresponding to this specific measurement point versus the maximum sensitivity obtained as a result of actual diagnostic measurement is found, and when there is a difference in these ratios, the amount of correction corresponding to this difference is found (step 309). According to FIG. 3, when a specific measurement point is measurement point D, and the measurement point corresponding to this point in actual measurement is measurement point D' in the figure, the ratio of $S_D$ to actual maximum sensitivity ($S_{max}$) is compared to the ratio of $S_D$ to the initial maximum sensitivity ($S_{ini\ max}$), and the amount of correction is determined in accordance with this difference. As in the case of the first correction, the parameter to be corrected can be the second parameter, in essence, the carrier gas flow rate, but the subject of correction can also be the third parameter, the sampling depth, in essence, the distance between the plasma torch and the interface.

Consequently, when the first method is used in the examples in FIGS. 7 and 8, the appropriate correction (parameter correction 1) is performed unless measurement point "10" is the measurement point where sensitivity was initially estimated to be at a maximum. On the other hand, when the second method is used, the appropriate correction (parameter correction 2) is performed by comparing the ratio of sensitivity $S_{19}$ versus maximum sensitivity $S_{max}$ with the ratio under standard conditions when, for instance, point "19" is the specific measurement point As shown related to FIG. 3, the amount of change corresponding to a difference in plasma conditions differs on the high plasma temperature side and low plasma temperature side. Consequently, calculation of the amount of correction, which is performed by the first and second correction methods, is performed based on a specific conversion rule or by a specific conversion table that is based on experience.

Correction of the parameter values can be performed for all combinations of parameters, but as previously described, when measurement has been performed based on the jump module during diagnostic measurement, the parameter combinations comprise two groups, because only the second group of the two groups is used for measurement after calibration; it is also possible to correct only the second group of parameter combinations. It should be noted that parameter correction can also be performed immediately before actual sample measurement. Moreover, the calculated amount of correction and the history of the parameters after correction can be stored and used for subsequent diagnostic measurement or actual sample measurement.

As previously described, the magnitude of the difference from the standard state calculated to find this amount of correction can be used to evaluate the quality during diagnosis. In essence, according to the example in FIG. 3, it is possible to perform diagnostic evaluation by means of the first method based on whether or not the extent to which the difference in coordinates between measurement point C and measurement point C' lies within a specific range, or by the second method based on whether or not the difference in the ratio of $S_D$' versus maximum sensitivity and the ratio of $S_D$ versus maximum sensitivity under standard conditions lies within a specific range.

As a result of the above-mentioned correction, the parameters are optimized and the calibration procedure is completed (step 311). The apparatus can then be used for actual measurement of samples having various matrix concentrations.

The above-mentioned description has described a diagnostic system and calibration system that are the preferred embodiments of the present disclosure, but these are merely representative examples and in no way limit the present disclosure, and a variety of modifications by persons skilled in the art are possible.

What is claimed is:

1. A diagnostic system for diagnosing the device properties attributed to the plasma state of an inductively coupled plasma mass spectrometer with which an aerosol comprising carrier gas and liquid drops containing an analysis sample is introduced into a plasma torch disposed near a work coil connected to a high-frequency power source in order to generate plasma, in such a way that it contains ions of the element in the aerosol, toward an interface having an orifice such that part of the components that form the plasma are allowed to pass through the orifice and are introduced into the mass analysis part, said diagnostic system comprising:

an aggregate of parameter combinations is stored, which is an aggregate of combinations of parameters consisting of a first parameter for determining the output of the high-frequency power source, a second parameter for determining the flow rate of the carrier gas in the aerosol, and a third parameter for determining the distance between the plasma torch and the interface, and which forms a specific array such that the measurement points corresponding to the respective combinations are lined up in order along the direction of length of an envelope that forms the end on the high-sensitivity side of a graph drawn as an aggregate of all measurement points on a sensitivity-oxide ion ratio graph, and a diagnostic measurement is performed with a specific diagnostic sample using the parameter value of each combination of said parameter combinations that form the aggregate such that the device properties can be confirmed from the position on the envelope on the sensitivity-oxide ion ratio graph of the actual measurement points corresponding to each combination.

2. The diagnostic system according to claim 1, further comprising, for diagnosis, means for determining the position on the envelope on the sensitivity-oxide ion ratio graph of the measurement points corresponding to each combination based on the coordinates of the actual measurement points when sensitivity is at a maximum.

3. The diagnostic system according to claim 1, wherein said aggregate of parameter combinations comprises a first group of parameter combinations wherein the third parameter is fixed and at least one of the first and second parameters is varied such that the point where sensitivity is at a maximum is determined by diagnostic measurement with a specific diagnostic sample.

4. The diagnostic system according to claim 3, wherein said aggregate of parameter combinations comprises a second group of parameter combinations wherein the oxide ion ratio is distributed on the small side, when compared with the first group, on the sensitivity-oxide ion ratio graph, and which is scheduled for use with or without modification by calibration after diagnosis.

5. The diagnostic system according to claim 1, further comprising means for preadjustment whereby prior to diagnosis, some of the device requirements are adjusted and the settings of said requirements are optimized.

6. The diagnostic system according to claim 5, wherein said means for preadjustment comprises at least one of the following: a torch position adjustment means with which prior to measurement using the aggregate of parameter combinations for diagnosis, sensitivity is measured using parameters set to a specific value and the position of the plasma torch is automatically adjusted in the direction that intersects the axis of the plasma torch such that it becomes the position wherein measurement sensitivity is at a maximum, and an ion lens adjustment means with which prior to measurement using the aggregate of parameter combinations for diagnosis, sensitivity is measured using parameters set to a specific value and the conditions of the ion lens located posterior to the interface inside the mass analysis part are adjusted to conditions where the measurement sensitivity is at a maximum within a specific condition range.

7. The diagnostic system according to claim 5, further comprising a shared software module for reading the parameters used in measurement is used for both preadjustment and diagnostic measurement.

8. The diagnostic system according to claim 7, wherein said software module comprises a scanning module for measuring with scanning an entire specific range of each of the selected parameters and a jump module for measuring for a specific parameter group of part of the specific range in accordance with the selected parameter or purpose of use.

9. A calibration system for calibrating the device properties of an inductively-coupled plasma mass spectrometer, which comprises:

a diagnostic system for diagnosing the device properties attributed to the plasma state of an inductively coupled plasma mass spectrometer with which an aerosol comprising carrier gas and liquid drops containing an analysis sample is introduced into a plasma torch disposed near a work coil connected to a high-frequency power source in order to generate plasma, in such a way that it contains ions of the element in the aerosol, toward an interface having an orifice such that part of the components that form the plasma are allowed to pass through the orifice and are introduced into the mass analysis part, said diagnostic system comprising: an aggregate of parameter combinations is stored, which is an aggregate of combinations of parameters consisting of a first parameter for determining the output of the high-frequency power source, a second parameter for determining the flow rate of the carrier gas in the aerosol, and a third parameter for determining the distance between the plasma torch and the interface, and which forms a specific array such that the measurement points corresponding to the respective combinations are lined up in order along the direction of length of an envelope that forms the end on the high-sensitivity side of a graph drawn as an aggregate of all measurement points on a sensitivity-oxide ion ratio graph, a diagnostic measurement is performed with a specific diagnostic sample using the parameter value of each combination of said parameter combinations that form the aggregate such that the device properties can be confirmed from the position on the envelope on the sensitivity-oxide ion ratio graph of the actual measurement points corresponding to each combination, and means for determining the position on the envelope on the sensitivity-oxide ion ratio graph of the measurement points corresponding to each combination based on the coordinates of the actual measurement points when sensitivity is at a maximum; and calibration means for preselecting a measurement point corresponding to a specific combination from among the aggregate of parameter combinations as the estimated maximum sensitivity point where sensitivity is estimated to be at a maximum and, when the estimated maximum sensitivity point differs from the actual measurement point where sensitivity is at a maximum as discovered from the diagnostic results, correcting each parameter value of at least some of the parameter combinations contained in the aggregate of parameter combinations by a specific rule such that maximum sensitivity can be produced at the points corresponding to the estimated maximum sensitivity points during actual measurement.

10. The calibration system according to claim 9, wherein said parameter changed by calibration is the second parameter.

11. A calibration system for calibrating the device properties of an inductively-coupled plasma mass spectrometer, characterized in that it comprises a diagnostic system for diagnosing the device properties attributed to the plasma state of an inductively coupled plasma mass spectrometer with which an aerosol comprising carrier gas and liquid drops containing an analysis sample is introduced into a plasma torch disposed near a work coil connected to a high-frequency power source in order to generate plasma, in such a way that it contains ions of the element in the aerosol, toward an interface having an orifice such that part of the components that form the plasma are allowed to pass through the orifice and are introduced into the mass analysis part, said diagnostic system comprising: an aggregate of parameter combinations is stored, which is an aggregate of combinations of parameters consisting of a first parameter for determining the output of the high-frequency power source, a second parameter for determining the flow rate of the carrier gas in the aerosol, and a third parameter for determining the distance between the plasma torch and the interface, and which forms a specific array such that the measurement points corresponding to the respective combinations are lined up in order along the direction of length of an envelope that forms the end on the high-sensitivity side of a graph drawn as an aggregate of all measurement points on a sensitivity-oxide ion ratio graph, a diagnostic measurement is performed with a specific diagnostic sample using the parameter value of each combination of said parameter combinations that form the aggregate such that the device properties can be confirmed from the position on the envelope on the sensitivity-oxide ion ratio graph of the actual measurement points corresponding to each combination, and means for determining the position on the envelope on the sensitivity-oxide ion ratio graph of the measurement points corresponding to each combination based on the coordinates of the actual measurement points when sensitivity is at a maximum; and calibration means wherein when the ratio of sensitivity at an actual measurement point wherein sensitivity is at a maximum based on diagnostic results and sensitivity at a specific reference measurement point corresponding to one combination of the aggregate of parameter combinations is outside a specific ratio, each parameter of at least some of the parameter combinations contained in the aggregate of parameters combinations is corrected by a specific rule.

12. The calibration system according to claim 11, wherein said parameter changed by calibration is the second or third parameter.

* * * * *